Aug. 8, 1950  F. RYSER  2,518,188
CHEESE MOLD
Filed April 29, 1947
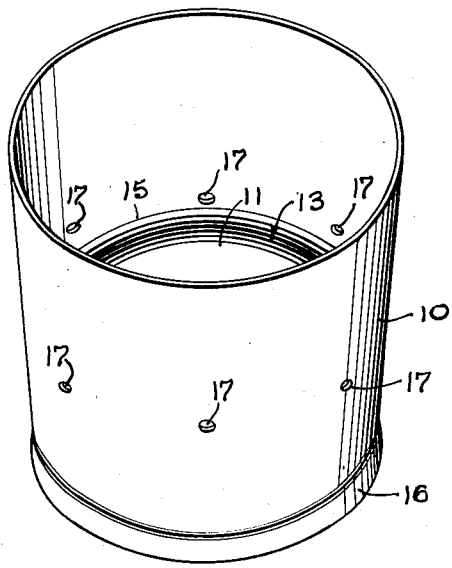
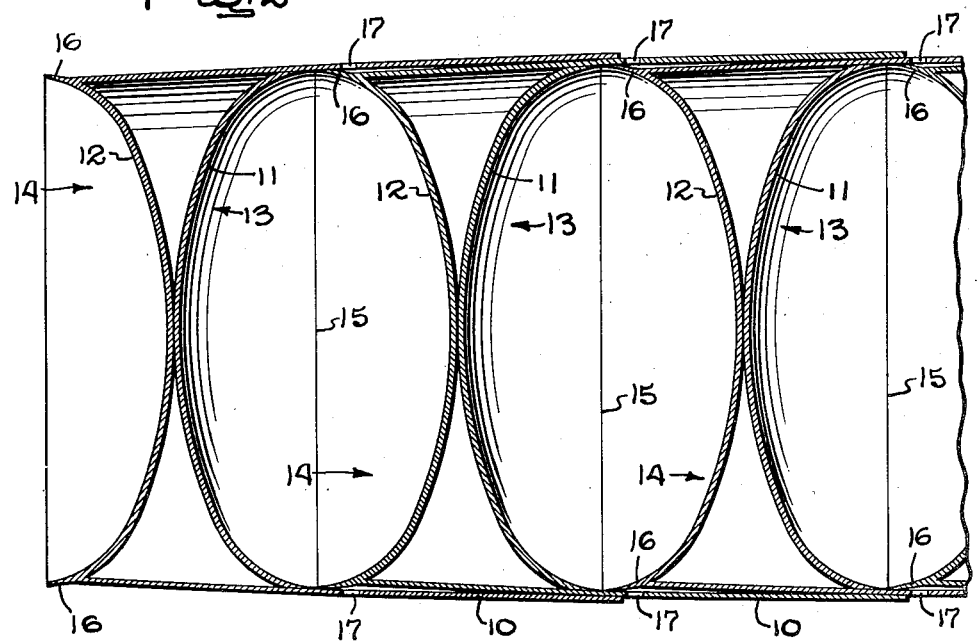
INVENTOR
Frank Ryser
ATTORNEYS Patented Aug. 8, 1950

2,518,188

UNITED STATES PATENT OFFICE 2,518,188

CHEESE MOLD

Frank Ryser, Chicago, Ill.

Application April 29, 1947, Serial No. 744,698

6 Claims. (Cl. 100—55)

The present invention pertains to apparatus for cheese making and more particularly to molds for making cheeses of various types such, for example, as Edam and small Gouda.

In making such cheeses, the ingredients are blended in a partially liquid condition and then placed in molds for pressing into the desired shape. In the pressing operation, the coagulant is forced together and surplus liquid or whey is squeezed out. Heretofore, the molds used to make such cheeses have comprised a pair of semi-ellipsoidal forms and a connector ring between the two forms. Thus it has been necessary to employ three separate elements in the molding of each cheese, entailing the expenditure of a considerable amount of time in assembling the parts and also a substantial investment in the equipment.

The primary object of the present invention is to overcome the aforementioned disadvantages through the provision, in an apparatus for making cheeses, of a novel sectional mold, the sections of which are adapted to be arranged in nesting relation so as to interact to form a number of closed interior mold chambers for shaping a plurality of individual cheeses in a single pressing operation.

The object of the invention thus generally set forth, together with other and ancillary advantages, is attained by the construction and arrangement shown by way of illustration in the accompanying drawings, in which:

Figure 1 is a perspective view of a mold section constructed in accordance with the present invention.

Fig. 2 is a sectional elevation illustrating a series of mold sections stacked in telescoping relation.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

In carrying out my invention, I provide a mold having a plurality of sections the number of which is one more than the number of individual cheeses to be formed. Each of the mold sections comprises, in general, an annular body and a wall or partition defining inner and outer oppositely facing and outwardly opening mold cavities, each section being fashioned for stacking with other like sections in partially telescoping or nested relation so that the outer cavity of one section confronts the inner cavity of the succeeding section, thereby providing a closed interior chamber for forming an individual cheese of smooth contour. Provision is, of course, made to permit escape of surplus liquid or whey as the cheese is formed.

Referring more particularly to the exemplary embodiment of the invention as illustrated in the drawings, each mold section there shown includes an annular body 10 and a partition comprising a pair of concave mold pieces 11 and 12 secured in back-to-back relation adjacent one end of the body and defining oppositely facing mold cavities 13 and 14.

To permit partial telescoping of one mold section with another, the annular body 10 is of slightly tapered form. The mold pieces 11 and 12 are identical and of semi-ellipsoidal shape having major diameters less than that of the large end of the body 10 but greater than its smallest diameter. Thus the inner mold piece 11 when inserted in the body 10 will contact the body intermediate its ends along a line 15. To permit the peripheral edge of the outer mold piece 12 to contact the body 10 and the peripheral edge of the inner mold piece 11 along the line 15 of a succeeding mold section in order to form a closed mold chamber for shaping an individual cheese, the small end of the body 10 is provided with an outwardly flared extension 16 of a diameter equal to the diameter of the body taken in the plane defined by the line 15. In the present instance, the portion of the outer mold piece 12 adjacent its peripheral edge is utilized to form the extension 16.

The body 10 is extended substantially above the inner mold piece 11 to provide a receptacle of sufficient capacity to hold the unpressed cheese. Such extension of the body, in addition, facilitates the handling of a number of sections at the same time by permitting them to be nested together.

As the cheese is pressed, whey is squeezed from the coagulant. To allow the whey to escape freely from the mold and to facilitate the telescoping of the sections by preventing entrapment of whey, a series of holes 17 is provided in the body 10. The holes 17 are located adjacent the line of juncture 15 between the inner mold piece 11 and the body 10 and are spaced above the line 15 a sufficient distance so as to be positioned opposite the point of smallest diameter of the succeeding mold section. The body 10 extends beyond the holes 17 to a point that will fall just short of a similarly located series of holes in the succeeding mold section so that at all times the holes will remain uncovered.

It will be observed that the construction and arrangement set forth provides a sectional mold for making cheese, simple in construction, having a minimum of separate elements and permitting of the formation of a number of individual cheeses in a single pressing operation.

I claim as my invention:

1. A cheese mold section comprising, in combination, a tapered annular body and a partition secured within and extending transversely of said body adjacent the small end thereof, said partition comprising two members in back-to-back relation defining oppositely facing and outwardly opening mold cavities of substantially uniform shape and size, said section being adapted for stacking in partially telescoping relation with other similar sections whereby a plurality of closed chambers are formed for shaping a number of individual cheeses in a single pressing operation.

2. A cheese mold section comprising, in combination, a tapered annular body and a partition made rigid within and extending transversely of said body adjacent its small end and defining inner and outer outwardly opening mold cavities, said section being adapted for stacking in telescoping relation with other like sections, and said body having a peripherally arranged series of holes therein adjacent said inner cavity to permit escape of whey.

3. A cheese mold section comprising, in combination, a tapered annular body and a partition made rigid within and extending transversely of said body adjacent its small end and defining inner and outer outwardly opening mold cavities of equal diameters, said section being adapted for stacking in telescoping relation with other like sections, and said body having its small end outwardly flared to a diameter equal to that of said cavities whereby closed chambers for shaping individual cheeses are formed upon telescoping said sections together.

4. In an apparatus for making cheese, a mold section comprising, in combination, a tapered annular body having its small end outwardly flared but of smaller diameter than that of its large end, and two semi-ellipsoidal mold pieces each having a major diameter equal to that of the flared end of said body, said mold pieces being secured in opposite outwardly facing directions within and extending transversely of said body adjacent the small end thereof, whereby a series of such mold sections can be pressed together in telescoping relation to form a plurality of closed chambers for shaping a number of individual cheeses in a single pressing operation.

5. In an apparatus for making cheese, a mold section comprising, in combination, an annular body, identical inner and outer mold pieces fixed in back-to-back relation transversely of one end of said body and having concave face portions, the peripheral edge portion of said outer mold piece forming an outwardly flared extension of said body, said section being adapted for stacking in telescoping relation with other like sections with the peripheral edge of said outer mold piece abutting the peripheral edge of the inner mold piece of a succeeding mold section whereby a closed interior mold chamber is formed by said face portions for shaping a cheese of smooth and uniform contour.

6. In an apparatus for making cheese, a mold section comprising, in combination, an annular body, identical inner and outer mold pieces fixed in back-to-back relation transversely of one end of said body and having concave face portions, the peripheral edge portion of said outer mold piece forming an outwardly flared extension of said body, said section being adapted for stacking in telescoping relation with other like sections with the peripheral edge of said outer mold piece abutting the peripheral edge of the inner mold piece of a succeeding mold section whereby a closed interior mold chamber is formed by said face portions for shaping a cheese of smooth contour, said body having a series of holes adjacent the peripheral edge of said inner mold piece to permit the escape of whey.

FRANK RYSER.

REFERENCES CITED

The following references are of record in the file of this patent:

UNITED STATES PATENTS

| Number | Name | Date |
|---|---|---|
| 34,241 | Codding | Jan. 28, 1862 |
| 1,195,370 | Larsen | Aug. 22, 1916 |
| 1,469,252 | Damrow | Oct. 2, 1923 |
| 2,002,597 | Williams | May 28, 1935 |
| 2,142,811 | Agonis | Jan. 3, 1939 |
| 2,266,336 | Royer | Dec. 16, 1941 |
| 2,271,822 | Hills | Feb. 3, 1942 |

FOREIGN PATENTS

| Number | Country | Date |
|---|---|---|
| 88,904 | Germany | Oct. 24, 1896 |